United States Patent [19]

Jones

[11] 3,971,535

[45] July 27, 1976

[54] OBLIQUE-WING SUPERSONIC AIRCRAFT

[75] Inventor: Robert T. Jones, Los Altos Hills, Calif.

[73] Assignee: The United States of America as represented by the Administrator of the National Aeronautics and Space Administration, Washington, D.C.

[22] Filed: Aug. 12, 1974

[21] Appl. No.: 496,779

Related U.S. Application Data

[63] Continuation of Ser. No. 321,180, Jan. 5, 1973, abandoned, which is a continuation-in-part of Ser. No. 206,279, Dec. 9, 1971, Pat. No. 3,737,121.

[52] U.S. Cl. ................................................. 244/46
[51] Int. Cl.² ........................................... B64C 3/40
[58] Field of Search ................ 244/46, 15, 13, 45 R, 244/43, 48, 55, 35 R, 2; D12/71, 73

[56] References Cited
UNITED STATES PATENTS

| 3,009,670 | 11/1961 | Williams et al. | 244/46 |
| 3,028,122 | 4/1962 | Riebe et al. | 244/46 |
| 3,047,255 | 7/1962 | Wallis | 244/46 X |
| 3,155,344 | 11/1964 | Vogt | 244/46 |
| 3,454,241 | 7/1969 | Riemerschmid | 244/55 |
| 3,455,523 | 7/1969 | Mertel | 244/55 |

FOREIGN PATENTS OR APPLICATIONS

| 435,033 | 2/1912 | France | 244/46 |
| 510,430 | 1/1955 | Italy | 244/46 |

Primary Examiner—Trygve M. Blix
Assistant Examiner—Barry L. Kelmachter
Attorney, Agent, or Firm—Darrell G. Brekke; Armand G. Morin, Sr.; John R. Manning

[57] ABSTRACT

An aircraft including a single fuselage having a main wing and a horizontal stabilizer airfoil pivotally attached at their centers to the fuselage. The pivotal attachments allow the airfoils to be yawed relative to the fuselage for high speed flight, and to be positioned at right angles with respect to the fuselage during take-off, landing, and low speed flight. The main wing and the horizontal stabilizer are upwardly curved from their center pivotal connections towards their ends to form curvilinear dihedrals.

20 Claims, 19 Drawing Figures

OBLIQUE-WING SUPERSONIC AIRCRAFT

ORIGIN OF THE INVENTION

The invention described herein was made by an employee of the United States Government and may be manufactured and used by or for the Government for governmental purposes without the payment of any royalties thereon or therefor.

RELATIONSHIP TO OTHER APPLICATIONS

This application is a continuation of application Ser. No. 321,180 filed January 5, 1973, now abandoned, which is a continuation-in-part of Ser. No. 206,279, filed Dec. 9, 1971, now U.S. Pat. No. 3,737,121.

BACKGROUND OF THE INVENTION

1. Field of the Invention

The present invention relates to improvements in winged aircraft and more particularly to an aircraft in which the relative disposition of wing to fuselage can be changed (yawed) in flight to optimize the aircraft's capability of flying at both transonic and supersonic speeds.

2. Discussion of the Prior Art

It is well known that the airframe configuration requirements for efficient supersonic flight are not compatible with the airframe configuration requirements for efficient slow speed flight, take-off and climb, or descent and landing. For low speed flight, and conventional take-off and landing, the optimum wing planform is generally considered to be a long span, narrow chord wing having little, if any, sweep angle.

Since the total lift developed by a lifting airfoil, with other factors such as angle of attack and dynamic pressures being equal, is substantially dependent on the aspect ratio of the airfoil, defined as the square of the span of the airfoil divided by the surface area thereof, it is apparent that a long narrow wing is capable of developing substantially greater lift-to-drag ratio than is attainable using a short broad wing of the same plan area. The use of the high aspect ratio wing offers the advantages that the angle of attack required for landing and take-off is at the low end of the spectrum. The take-off and landing speeds are lower than for low aspect ratio wings, thus permitting a relatively short take-off and landing, as well as a low speed climb to altitude. Furthermore, the drag due to lift is also at the low end of the spectrum, thereby providing high aerodynamic efficiency for subsonic cruise and low power requirement during take-off and landing.

For transonic and supersonic flight however, highly swept wings are considered preferrable because aerodynamic drag may be greatly reduced thereby, and other advantages are also obtained. For example, even during high altitude subsonic cruise the highly swept wing configuration develops a comparatively low drag coefficient, while still developing the required lift coefficient. It has been experimentally shown that lift/drag ratios of 10 to 12 may be obtained with the highly swept wing at supersonic high altitude cruise thus making such flights economically feasible even in the case of commercial transport aircraft. The highly swept wing configuration is also preferred for supersonic flight at low levels, where the combination of high dynamic pressure at the high frequency end of the gust spectrum may establish the structural strength requirements of the aircraft, since the gust loads imposed on a highly swept wing are much smaller than on a more or less straight wing due to a smaller change in lift force resulting from change in the angle of attack. This result is due to the fact that a moving aircraft experiences atmospheric turbulence only as the result of sudden changes in the angle of attack which may be said to be in the direction of the resultant of the vertical component of gust velocity and horizontal component of aircraft velocity.

However, a swept wing aircraft designed solely on the basis of supersonic high performance flight will obviously not perform satisfactorily for subsonic cruise, take-off and landing. Even present day supersonic aircraft are designed with aspect ratios higher than that considered optimum for supersonic cruising flight in order to make take-off and landing feasible. These supersonic aircraft must also climb to cruise altitude at subsonic speeds to prevent heavy shock wave ground damage and they must do this at the expense of increased fuel consumption since the relatively low aspect ratio of the wing results in increased drag due to lift while in the climb. For example, it is not unusual for a supersonic swept wing transport on a transatlantic flight to expend 30% or more of its total fuel requirement during take-off and climb to cruise altitude at subsonic speed.

Various attempts have been made to enable the wing configuration of an aircraft to be modified in flight so as to optimize both the low speed and high speed performance of the aircraft. Examples of these so-called variable geometry aircraft, in which the sweep back is modified by moving the wings relative to the fuselage in simple or compound motions, are disclosed in the U.S. Patents to Alfred, Jr. et al., U.S. Pat. No. 3,053,484; Halliwell, U.S. Pat. No. 3,133,716; Jacquart et al., U.S. Pat. No. 3,381,918; Willox, U.S. Pat. No. 3,405,280; Jacquart et al., U.S. Pat. No. 3,405,891; and Whitener et al. U.S. Pat. No. 3,447,761. Such examples include devices which swivel each wing about pivots so as to effect a transition from sharp sweep back suited for high speeds, to smaller sweep back for obtaining the necessary lift at low speeds.

These solutions, however, have the inherent disadvantages that the swiveling of the wings results in a shift in the center of pressure of the aerodynamic forces exerted thereon as well as in a displacement of the center of gravity of the aircraft. Furthermore, the position of the center of lift is effected by the flight speed with the transition from subsonic to supersonic speed notably resulting in a large rearward shift of the center of pressure of the force exerted on the wing. In addition, the structural components necessary to accommodate a wing pivoted at a point near one of its ends requires the use of massive bearings which must carry the wing root bending moment.

The use of an airframe configuration having a single fuselage with a main wing movable to selected positions depending upon flight characteristics is also known. Vogt U.S. Pat. No. 3,155,344 provides an aircraft having a single fuselage with two sets of rotatably mounted integral wings, one set for supersonic flight having a small area, and another set for subsonic flight having a relatively large area. Hubschman U.S. Pat. No. 1,740,016 discloses an aircraft wherein the wing-to-fuselage angle of separate left and right wings can be independently adjusted by the pilot using a hand crank, with FIG. 6 thereof showing a skewed relationship between the wings and the fuselage. Crook U.S. Pat.

No. 3,258,228 discloses an aircraft wherein the payload unit can be trimmed to a different attitude from that of a flight unit, the latter including a wing configuration. The flight unit can be held offset relative to the payload unit, for example, to maintain aerodynamic efficiency in case of a cross wind.

The idea of turning the wing as a whole with respect to a single fuselage by providing a wing pivotally attached to the fuselage so that it can be set at right angles to the fuselage for take-off, landing, and low speed flight, and pivoted as a unit so that is is skewed with one side of the wing swept forward and the other swept back at high speeds has also been proposed. See applicant's papers entitled "Theoretical Determination of the Minimum Drag of Airfoils at Supersonic Speeds," *Journal of the Aeronautical sciences*, Vol 19, No. 12, December 1952, pp. 813–822; and "Aerodynamic Design for Supersonic Speeds", *Proceedings of the First International Congress in the Aeronautical Sciences*, Madrid, September 1958, *Advances in Aeronautical Sciences*, Pergamon Press, N.Y., 1959, pp. 34–51.

Studies of the stability and control of oblique or skewed winged aircraft have also been made. See the paper by Campbell, J.P. and Drake, H.M., "Investigation of Stability and Control Characteristics of an Airplane Model with Skewed Wing in the Langley Free-Flight Tunnel," TN 1208, 1947, NACA. The advantages of an "all wing" aircraft arranged so that it can be steered to fly at varying oblique angles have been considered. Note Lee, G.H., comments appended to Kuchemann, D., "Aircraft Shapes and Their Aerodynamics," *Proceedings of the 2nd I.C.A.S. Advances in Aeronautical Sciences*, Vol. 3–4, Pergamon Press, N.Y., 1962, pp. 221–252; and Lee, G.H., "Slewed Wing Supersonics," *The Airplane*, Vol. 100, Mar. 3, 1961, pp. 240–241.

Applicant's previously mentioned patent, U.S. Pat. No. 3,737,121, discloses an airframe in which a parallelogram principle is utilized to achieve an efficient selective angular disposition between a pair of airfoils (a main wing and a horizontal stabilizer) and a pair of fuselages. The main wing and the horizontal stabilizer form one set of parallel sides of the parallelogram while the two fuselages form the other two sides. The two airfoils are pivoted with respect to the spaced fuselages and enable two important in-flight changes in aircraft configuration to be effected: (1) the skewing or yawning of the airfoils relative to the direction of flight for high speed flight; and (2) the lateral spreading of the weight distribution to minimize the bending stresses of the wing. The increased extension of the aircraft components in the fore and aft direction serves further to reduce the drag at supersonic speed, and the upwardly curved main wing configuration compensates for any roll tendency caused by the yawed positioning of the wing.

SUMMARY OF THE DISCLOSURE

The instant invention relates to an aircraft having a single continuous wing mounted above a single fuselage and pivoted at the wing center point so that it can be rotated from the straight wing perpendicular to the fuselage at take-off to various oblique angles at higher speeds. Half the wing is thus pointed more towards the direction of flight at high speeds and the other half trails. The wing has a small amount of upward curvature forming a curvilinear dihedral which—when the wing is yawed—is equivalent to twist and affords an increased angle of attack for the forward portion and a decreased angle for the rearward portion.

Varying the sweep by turning the wing as a whole has several practical advantages over the usual "swing wing" design. In the former case, the wing structure is continuous across the pivot and the primary load on the pivot is tension. With separate wing panels pivoted at the root, however, the loads developed on the pivots are much greater. Also, sweeping the wing panels back for high speed flight displaces the center of lift rearward, compounding the normal rearward center of pressure shift at these speeds. Turning the wing as a whole, however, does not displace the centroid of area relative to the center of gravity. Even with fixed geometry, the structure of the bilaterally symmetric wing is less favorable because of the unbalanced torsion at the wing root. The unbalanced torsion may be equated approximately to increase beam length for the swept wing. Also, conforming to the "area rule," the swept wing requires a rather localized and deep indentation of the fuselage to form a tuck-in or "wasp waist". The optimum fuselage shape for the oblique wing, however, is much more nearly cylindrical. That means more cargo space or passenger space can be provided.

The following advantages also result from the instant invention:

1. Reduced noise problem, because the straight wing allows a take-off power requirement only 25% that of the delta-wing designs. By restricting cruise speed to March 1.5 quieter turbofan engines with bypass ratios on the order of 4:1 may be used. Engine noise is a major problem with the Boeing 2707–300 supersonic transport and the Concorde;

2. Maximum efficiency at any speed, allowing the aircraft to avoid the sonic boom problem because it could operate economically over land at Mach 1.0 to 1.3, a speed range that would not produce a boom. Then it could accelerate to Mach 1.5 over water;

3. Superior lift/drag ratios compared to a delta wing. Wing tunnel tests on a model according to the invention showed a lift/drag ratio of 31 to 1 at Mach 0.7 with the wing in the straight position. At 45 deg. and Mach 0.98, the lift/drag was 20 to 1, and at 60 deg. and Mach 1.4, it was 11 to 1. The comparable ratio for a delta wing at Mach 1.4 was about eight to one, and for a 63-deg. swept wing it was nine to one. While these advantages are only realized in the lower Mach numbers, and tend to disappear at Mach 2, this is no problem because the jump to Mach 2 in the British-French Concorde and to Mach 2.7 for the U.S. entry present certain problems;

4. Cruise altitude of 40,000 ft., thus avoiding the charge of polluting the stratosphere—another major complaint against the Concorde type SST—which cruises at about 50–60,000 ft. This higher cruise altitude also may present radiation hazards;

5. Lower take-off and landing speeds, the latter being about 125 knots compared to 200 knots for delta wing models;

6. The aircraft would require only about one-fourth the takeoff energy and fuel compared to detal wing planes with similar payloads.

DETAILED DESCRIPTION OF THE INVENTION

In aircraft design, once the velocity of sound is exceeded, the laws of aerodynamics change in such a way as to make it inadvisable to arrange the components of an aircraft in side-by-side or abreast relationship in a supersonic airstream unless there are compelling reasons for doing so. Both the well known transonic area rule and the supersonic small disturbance theory show large adverse interference effects for bodies or wings in a mirror-symmetric arrangement.

New demands on supersonic aircraft (SST) for better economy and less noise necessitate a different concept in the design of such aircraft. The invention utilizes an almost perfectly conventional subsonic aircraft equipped with a single wing having a high aspect ratio and curvilinear dihedral, but with the wing arranged so that it can be turned to different oblique angles for flight at different Mach numbers.

To determine an optimum wing shape, or a shape having a minimum of drag, it is necessary first of all to adopt some constraint on the dimensions of the wing. Thus in Munk's problem of minimum induced drag the span of the wing is supposed to be limited. See NACA TR 121, "The Minimum Induced Drag of aerofoils," Max M. Munk, 1921. With the total lift given, the induced drag or vortex drag is then found to be a minimum when the lift is distributed elliptically over the span. Furthermore, the vortex drag is independent of the distribution of lift in the direction of flight. If a limitation on the maximum lift coefficient is recognized and if the skin friction is taken into account, the optimum wing planform turns out to be a narrow ellipse with its long axis perpendicular to the direction of flight.

At supersonic speeds one must consider in addition to the vortex drag and the friction, a wave drag associated with the thickness or volume of the wing as well as with the lift distribution. These latter components are not independent of the distribution in the flight direction, but diminish rapidly and continuously as the length of the wing in the flight direction is increased. It is necessary therefore to adopt a limitation on the length of the wing as well as the span. In spite of the additional sources of drag, the additional constraint, and the fact that the flow equation is now hyperbolic instead of elliptic, the subsonic elliptic wing reappears as the optimum for supersonic speeds. The wing merely takes up the greatest "subsonic sweep" angle permitted by the constraints. The minimum drag again occurs when the spanwise loading is elliptical and when the thickness-chord ratio of the wing sections falls off elipitcally toward the tips. See *Journal of the Aeronautical Sciences*, supra, and Smith, J.H.B., "Lift/Drag Ratios of Optimized Slewed Elliptic Wings at Supersonic Speeds," *The Aeronautical Quarterly*, Royal Aeronautical Quarterly, Royal Aeronautical Society, Vol XII, August 1961, pp. 201–218. The optimum supersonic wing planform thus does not have the bilateral or mirror symmetry of the subsonic wing, and thus the optimum thin planar wing cannot have the usual arrow or deltal form. According to the reversibility theorems of Karman and Hayes (Von Karman, Th., "Supersonic Aerodynamics Principles and Application," *Journal of the Aeronautical Sciences*, Vol. 14, No. 7, July 1947, pp. 373–409; and Hayes, W.D., "Linearized Supersonic Flow," Rep. AL 222, June 1947, North American Aviation, Inc,. Los Angeles, also Thesis, Calif. Inst. of Technology), a given distribution of lift or volume must have the same wave drag when flying in the opposite direction. According to Munk's theorem the vortex drag must be the same also. Hence, if the arrow wing were the optimum, the reversed arrow would also be the optimum.

The reversibility theorems thus indicate that an optimum shape should have fore and aft symmetry, i.e., should look the same for either direction of flight. The oblique ellipse satisfies this criterion, having both longitudinal and lateral symmetry but not bilateral symmetry. The indication of fore and aft symmetry is certainly remarkable since neither the supersonic flow field nor the local distribution of the drag shows this kind of symmetry. A limitation here is that of small disturbance theory. Local details of the airfoil section shape are strongly influence by nonlinear effects, and are, of course, not reversible.

Figure 1:
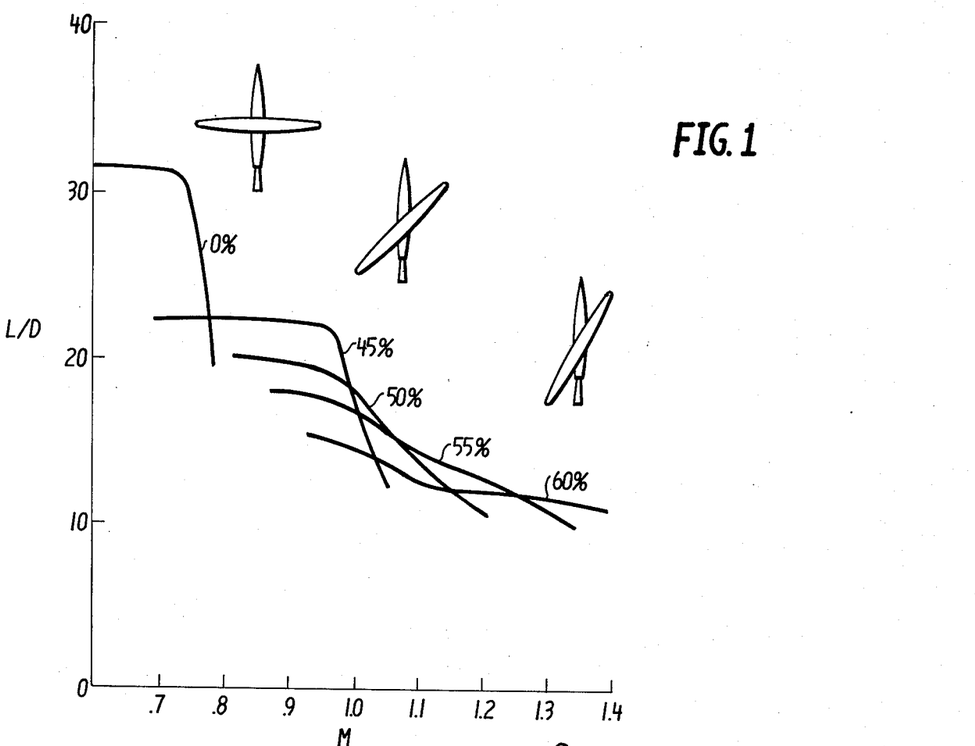
FIG. 1 is a diagram showing lift-drag ratios at different Mach numbers, for a single fuselage yawable wing aircraft in accordance with the invention.

FIG. 1 shows results of wind tunnel experiments made at NASA-Ames Research Center specifically to test the foregoing theoretical predictions. The wing had a quasielliptic planform of 10 to 1 axis ratio (aspect ratio 12.7) and was attached in the high wing position to a fuselage of 12 to 1 fineness ratio. The airfoil sections were 10 percent thick and were derived by the conventional NACA "4-digit" formula. In order to maintain the desired symmetry of the lift distribution in the yawed position the wing was constructed without twist but with a calculated amount of upward curvature, i.e., a "curvilinear dihedral" in the unyawed position. The wing thus has bilateral symmetry in the unyawed position. With the wing in the oblique positions the curvilinear dihedral has an aerodynamic effect equivalent to that of twist.

The tests confirmed the theoretical predictions. With the wing straight the maximum lift-drag ratio was in excess of 30 to 1 at Mach numbers (M) up to 0.7, but feel abruptly to 11 at M = 0.8. The wing was then turned to 45° and $(L/D)_{max}$ increased to 20 at M = 0.98. At M = 1.4 and a wing angle of 60°, $(L/D)_{max}$ was approximately 11. These values are in every case significantly higher than those previously obtained with arrow wing or delta wing-body combinations.

I have found that with an appropriate value of upward curvature, variations of wing angle up to 45° produced no apparent changes in stability and only a slight change in lateral trim—requiring a 1° or 2° offset of the ailerons. Elevator and aileron effectiveness remained normal and no change in longitudinal trim was observed.

FIGS. 2–5 of the drawings show a preferred embodiment of the present invention in the form of a single fuselage, yawable wing transport aircraft 10. Aircraft 10 includes fuselage 11 and an airfoil including a main wing 12 and a horizontal stabilizer 13. The outer hull of fuselage 11 is of generally conventional supersonic design with vertical stabilizer 14 affixed to the aft end thereof.

Figure 2:
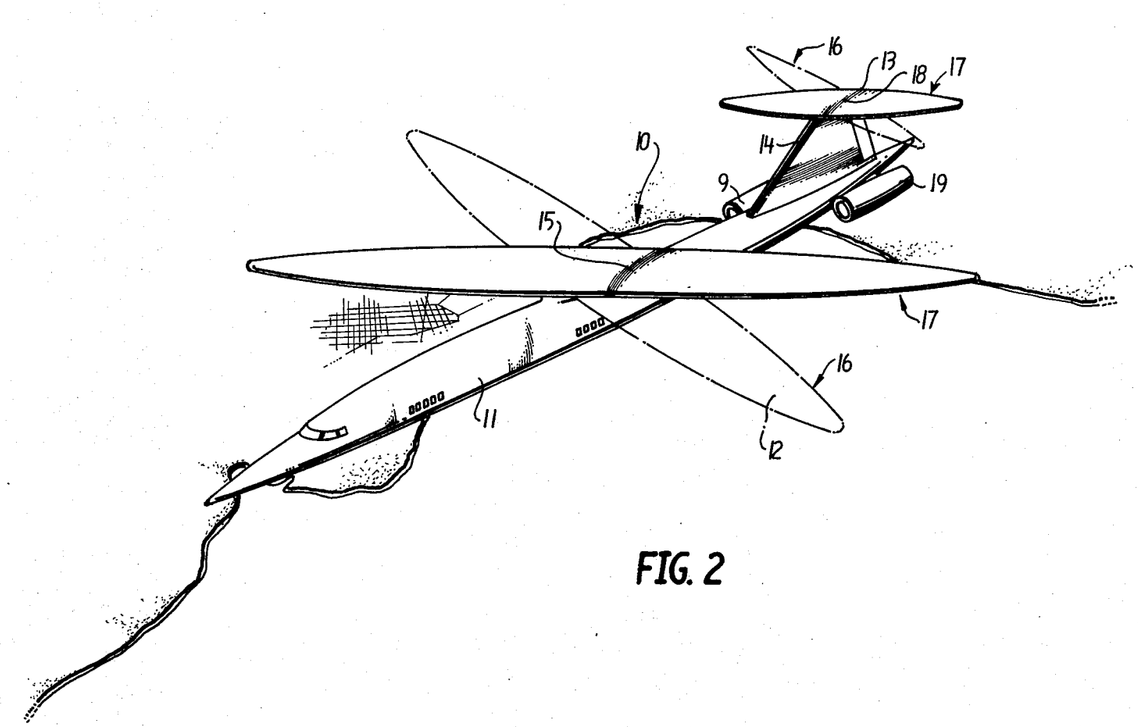
FIG. 2 is a perspective view showing a single fuselage yawable wing aircraft in accordance with the invention.
Figure 3:
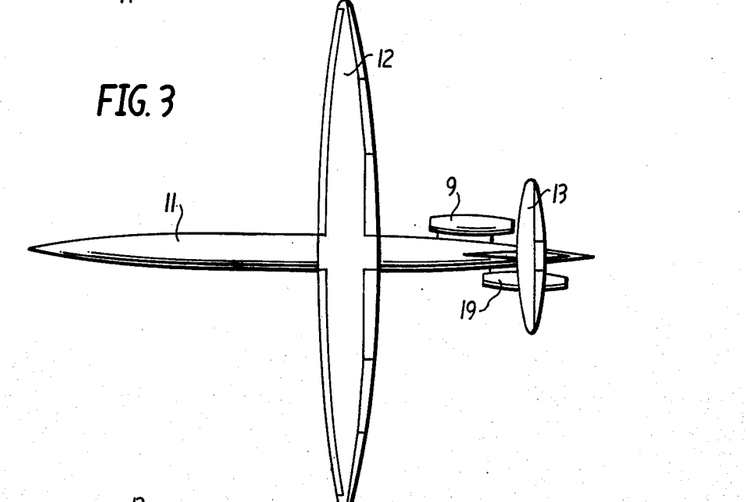
FIG. 3 is a top plan view of a single fuselage yawable aircraft with the wing in a position perpendicular to the longitudinal axis of the fuselage.
Figure 4:
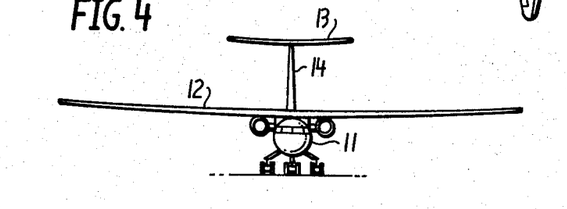
FIG. 4 is a front view of a single fuselage yawable aircraft according to the invention, showing the curvilinear dihedrals of the wing and horizontal stabilizer.

Wing 12 is preferably a high aspect ratio airfoil of elliptic or quasielliptic planform and is pivotally attached at its midpoint 15 to fuselage 11. The wing is pivotable between a first low speed configuration 16 where its long axis is at 90° relative to fuselage 11, as shown in FIGS. 2 and 3, and a second high speed configuration 17 where its long axis is at angles of less than 90° relative to the fuselage, as shown in FIG. 2. Wing 12 has a specified upward curvature from its center toward each tip to form a curvilinear dihedral as shown in FIG. 4, which automatically compensates for change in rolling moment trim as the yaw angle is varied. The curvature also serves to maintain a favorable distribution of lift along the wing as the yaw angle is varied and diminishes the stall tendency of the downstream tip. The described curvilinear dihedral wing 12 produces the aerodynamic effect of a twist during flight. It is well known that the leading edge of a supersonic wing should have one angle of attack at the root, and a different angle of attack at the tip. The aforementioned twist results in the desired attack angles. The curvilinear dihedral concept may also be used with swept winged aircraft.

Horizontal stabilizer 13, similar in design to airfoil 12, is also pivotally attached at its midpoint 18 to the aft end of fuselage 11 in a suitable manner, as for example, to the top of vertical stabilizer 14. FIG. 4 shows stabilizer 13 as also having an upward curvature from its center towards each tip to form a curvilinear dihedral. However, the shown pivotal connection of horizontal stabilizer 13 and its curvilinear dihedral shape are not essential features of the invention.

According to a basic teaching of this invention, the wave drag interference between elements of volume of the aircraft becomes favorable when such volume elements are disposed along oblique lines whose sweep angle is greater than the Mach angle. In accordance with this principle, jet engine propulsion units 9 and 19 are stagger-positioned along fuselage 11 as shown in FIG. 3. Propulsion unit 19 could be ahead of propulsion unit 9. The angle of the stagger may be fixed for convenience at an angle greater than the Mach angle corresponding to the highest operating speed of the aircraft. It is to be understood that the staggered propulsion units may be positioned elsewhere on the aircraft (for example, on the fuselage under the wing or on the vertical stabilizer) and that more than two jet engines may be employed if they are required by FAA regulation, etc.

Figure 5:
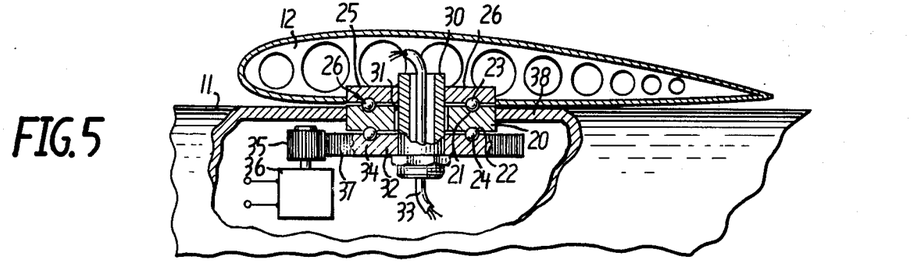
FIG. 5 is a partial cross section schematically illustrating in simplified form one way in which the airfoils of the illustrated embodiment may be pivotally attached to the fuselage.

The manner in which wing 12 and stabilizer 13 are attached to fuselage 11 may be any suitable design which permits the airfoil to be skewed or yawed relative to the fuselage into a selected yaw configuration. It will, of course, be understood that such mechanism must be capable of withstanding the various loads imparted between the various bodies, while at the same time permitting a substantial degree of freedom of relative rotational movement. A simplified pivoting mechanism for allowing substantially frictionless rotational motion between wing 12 and fuselage 11 is shown in FIG. 5 and includes a bearing plate 20 affixed to the superstructure 38 of fuselage 11. Plate 20 is provided with bearing races 21 and 22 on the upper and lower surfaces thereof for receiving suitable bearings 23 and 24, respectively. A matching bearing plate 25 is secured to the super-structure of wing 12 at the lower surface thereof. Plate 25 also includes a race 26 for receiving bearings 23.

A cylindrical shaft 30 is rigidly affixed to wing 12 and bearing plate 25 and extends through an opening 31 in bearing plate 20 where it is coupled and key locked to a gear 32. Shaft 30 has an inside diameter large enough to provide a passageway through which the required electrical and/or hydraulic control connections 33 can be passed. The upper surface of gear 32 is also provided with a bearing race 34 for receiving bearings 24. Gear 32, when locked to shaft 30, prevents the shaft from moving axially through opening 31. Gear 31 is driven by a drive gear 35 which is in turn driven by a motor 36. The teeth 37 on gear 32 need not extend around the entire circumference thereof, but only around an arcuate section corresponding to the maximum yaw angle for wing 12.

Figure 6:
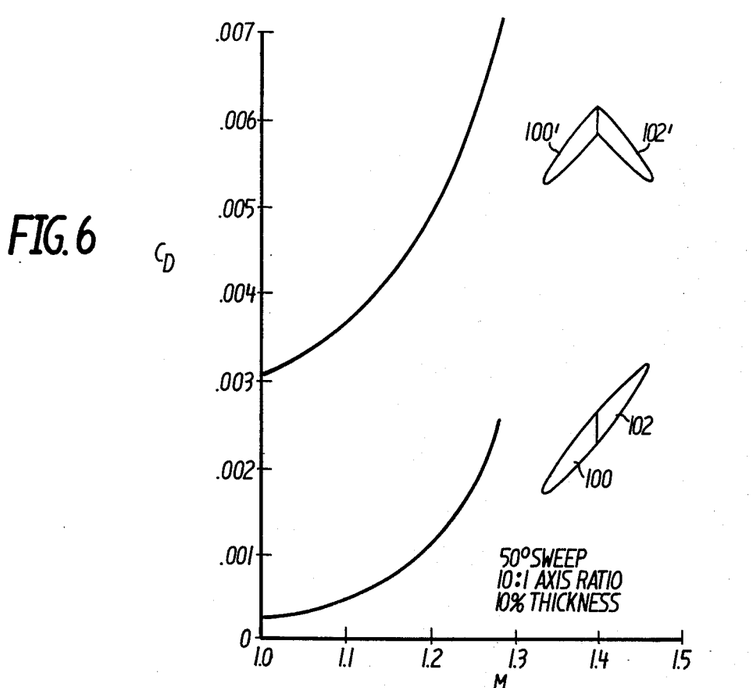
FIG. 6 is a diagram illustrating the calculated wave drag of symmetric and anti-symmetric wings.

In FIG. 6, the drag $C_D$ on two wing panels 100 and 102 disposed in the yawed, straight wing configuration is compared to the drag imposed on similar wing panels 100' and 102' disposed in the swept-back configuration. The swept-back "arrow" configuration formed by panels 100' and 102', which seems intuitively correct for supersonic speed, nevertheless, has a predicted wave drag considerably larger than that for the antisymmetric yawed arrangement formed by panels 100 and 102.

Elements of lift, or volume show favorable wave interference if they are disposed along lines whose normal component velocity is subsonic. Thus, the wave drag of a narrow wing tends toward zero, if the wing is swept behind the Mach cone. For example, see Jones, R. T., "Wing Planforms for High Speed Flight," TN 1033, 1946, NACA, Rep. 863, 1947, NACA. The wave drag reversibility theorems however, indicate that a distribution of lift or volume having a minimum drag should show the same aspect for two opposite directions of flight, i.e., would have fore and aft symmetry. Consideration of the vortex drag indicates further that the projected lift distribution should have lateral symmetry, e.g., eliptical span loading.

It is interesting that supersonic theory favors symmetry in both longitudinal and lateral distributions of volume or lift, but evidently not mirror symmetry. Intuitively, one would expect that the flight direction of an aircraft should be reflected in its shape, i.e., it should somehow point in the direction towards which it is intended to go. However, in view of the reversibility of the wave drag, current computer programs give the same value of the drag and the lift curve slope as determined by linear theory. Thus, the effect of viscosity demands locally different shapes for leading and trailing edges, which are not reversible in practice.

In order to obtain a configuration having a minimum wave drag, the total lift and volume as well as the plane area in which the dimensions of the aircraft are to be limited must be given. It can be shown that for any area abutted by two stream lines 106 and 108 (See FIG. 7) and two characteristic lines 110 and 112, the distribution of lift and volume yielding the minimum pressure drag (i.e., wave drag plus vortex drag) places all the elements of lift and volume near a diagonal "lifting line 114." Such a diagonal line may be considered the limiting configuration of the narrow elliptical wing 120 shown in FIG. 7.

Figure 7:
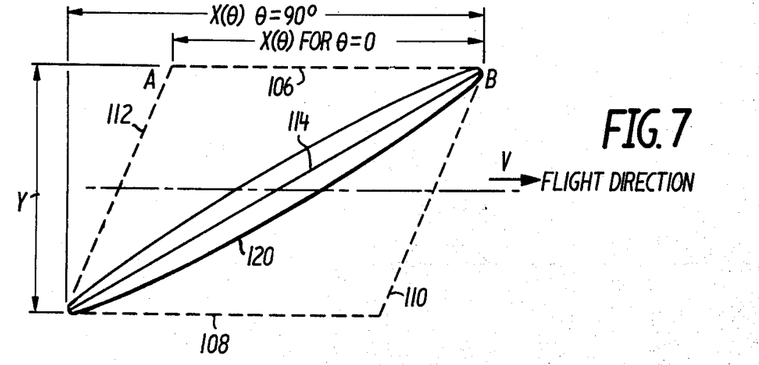
FIG. 7 is a diagram illustrating the optimum distribution of lift and volume within an area A B C D.

Minimum drag occurs when the surface loading of the elipse is uniform and when the thickness is distributed so that the projected cross sectional areas (taken along lines parallel to the flight direction indicated by the arrow V) are those of a Sears-Haack body. See Jones, R. T., "Possibilities of Efficient High Speed Transport Airplanes," *Proceedings of Conference on High Speed Aeronautics*, Polytechnic Institute of Brooklyn, Jan 20–22, 1955, Edward Bros. 1; and Smith, J. H. B., "Lift/Drag Ratios of Optimized Slewed Elliptical Wings as Supersonic Speeds", *The Aeronautical Quarterly*, Royal Aeronautical Society, Volume XII, September 1961. This result is of interest not so much as an exact prescription of shape, but because it indicates that lift and volume can be concentrated within a narrow dimension having a small wetted area, and hence small friction drag, provided the "lifting line" extends in a subsonic direction. Linear theory shows an infinite drag if the lifting line becomes supersonic.

In conventional aircraft, smooth airfoil sections are only found in planes perpendicular to the long axis of the wing. Other sections harbor joints and discontinuities. In a wing with varying angles of obliquity, discontinuities prevent smooth airflow distribution, causing shock waves and increased drag. Wing 12 should have a smooth and continuous distribution of cross-sectional area (or volume) along its span. That is, sections in planes parallel to the long wing axis should be smooth and free of discontinuities as well as sections perpendicular and oblique to the axis. This is most easily accomplished when the greater portion of each section is curvilinear.

Conventional wings are blunt and thick at the tip. If such a wing were used obliquely as in the present invention, a strong detached shock wave would occur at the forward-most tip. The shock wave would increase the drag. The drag can be reduced to a minimum by controlling the variation of volume of the wing along the span.

If $S$ is the area of a wing cross-section at position $Y$ from the midspan, if $b$ = span, and $\theta$ is a parametric representation of that position given by $$\frac{2y}{b} = \cos \theta \qquad (1)$$

then $$S'(y) = \frac{dS}{dy} \qquad (2)$$

will be the rate of change of area (cross-sectional) from the midspan to the wing tips.

The minimum drag due to the thickness or volume of the wing occurs when the areas $S(Y)$ has a particular distribution given by $$S'(Y) = A_2 \sin 2\theta \qquad (3)$$

where $A_2$ is a constant and $\theta$ is defined by $$\cos \theta = \frac{2y}{b} \qquad (4)$$

If the area distribution departs from equation (3) by small amounts leading to additional terms such as $$S'(Y) = A_2 \sin 2\theta + A_4 \sin 4\theta + A_n \sin n\theta$$

then the drag will be increased in proportion to the quantities $$nA^2_n$$

for the additional terms.

The favorable properties of the yawed wing depend first of all on the maintenance of a subsonic type of section flow at supersonic speeds, and this requires that the long axis of the wing be placed at an angle of yaw relative to the longitudinal axis of the fuselage such that the Mach number (M) of a component normal to its long axis is subsonic. If it is assumed that the critical "drag divergence" Mach number of the wings section is 0.7, then the angle of yaw must be such as to reduce the Mach number of the normal component to this value. At M = 1.0 the angle of yaw required is 45°.

Another advantage of the yawed wing over the swept wing relates to the increased extension of the wing in the flight direction. As is well known, spreading the lift over a greater length in the direction of flight diminishes both the sonic boom intensity and the drag. For a given structural slenderness, the single yawed wing panel may have nearly twice the projected length (along the flight direction) of the corresponding swept wing. In the illustrated preferred embodiment the wing is spread over a greater than usual length in the flight direction, as are the fuselage and engines in order to obtain reduced drag and lower sonic boom intensity. These statements may be supported by linear drag theory where drag is expressed as:

$$\text{Drag} = C_{D_0} \; qS_w + \frac{L^2}{\pi q Y^2} + \frac{M^2 - 1}{2\pi q} \frac{L^2}{\overline{X}_1^2} + \frac{128q}{\pi} \frac{\text{Vol.}^2}{\overline{X}_2^4} \quad (5)$$

where
$C_{D_0}$ is the viscous or friction drag coefficient;
$q$ is the dynamic pressure $(\rho V^2)/2$, where $\rho$ is air density and $V$ is velocity;
$S_w$ is the wing area;
$Y$ is the wing span as shown in FIG. 7;
$\overline{X}_1$ and $\overline{X}_2$ are the average lengths $X(\theta)$ of the wing as projected by characteristic planes (Mach planes) set at different angles $\theta$ around the X axis. The lengths $\overline{X}_1$ and $\overline{X}_2$ are defined by the expressions $$\frac{1}{\overline{X}_1^2} = \frac{1}{\pi} \int_0^{2\pi} \frac{\sin^2 \theta}{X(\theta)^2} d\theta \quad (6)$$

$$\frac{1}{\overline{X}_2^4} = \frac{1}{2\pi} \int_0^{2\pi} \frac{d\theta}{X(\theta)^4} \quad (7)$$

In equation (1), the distributions of lift and volume assumed are those giving the smallest drag consistent with the geometric constraints X and Y. At low supersonic Mach numbers and large angles of sweep or yaw, the lengths $\overline{X}_1$ and $\overline{X}_2$ are close to the actual X-wise extension, or length of the wing. Hence, the wave drag due to the lift diminishes approximately as the inverse square of the length, while the wave drag due to volume goes down with the inverse fourth power.

The second term of equation (1) is the well known linear formula for the induced drag of a wing having an elliptic span-load distribution. Here one tries to maximize the span Y and to minimize the wetted area ($2S_w$) by reducing the width of the wing in the flight direction. According to the linear theory (induced drag theory), the drag of the wing at subsonic speeds is independent of either the extension or the distribution of lift in the flight direction. Hence, the long, narrow, straight wing, or "lifting line," is ideal at subsonic speeds since it minimizes the wetted area. The success of the rule for increasing the lift-to-drag ratio L/D, by increasing the aspect ratio depends however, on the maintenance of Kutta-Joukowsky flow. If one tries to approach the "lifting line" too closely the lifting pressure becomes excessive and nonlinear effects associated with flow separation or shock losses will intervene. In spite of these limiting phenomena, sailplanes with extreme proportions have achieved L/D ratios as high as 40 or 50:1.

At supersonic speeds the appearance of the wave drag (third and fourth terms of equation 2) requires that the wing have as great a length as possible, as well as a wide span and small surface area. The rules determining the optimum wing form are then similar to those determining the wing form for a sailplane, except that at supersonic speeds one tries to maximize the span and the length in the flight direction while still having a minimum surface area. Again, if one tries to approach the idealized lifting line too closely, nonlinear phenomena will intervene. Also, the lifting pressure may exceed the maximum lift coefficient of the sections, or if the crosswise component Mach number is too high, super-critical shock losses will appear.

Figure 8:
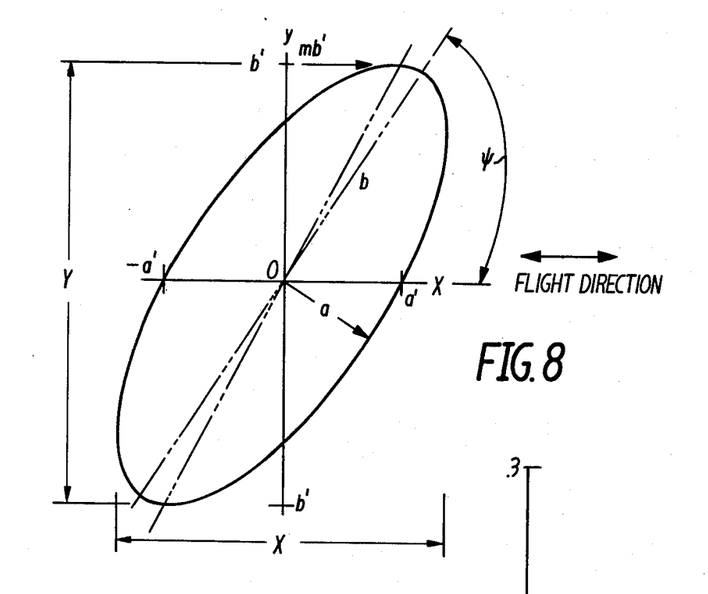
FIG. 8 is a diagram showing the oblique elipse notation used in the specification.

For the wing of elliptic planform as illustrated generally in FIG. 8, the pressure drag associated with the lift (wave drag and vortex drag) is a minimum when the lift is distributed uniformly over the surface. The formula given by linear theory in this case is, $$\Delta C_D = \frac{C_L^2}{4} R.P. \sqrt{\beta^2 - (m + i \frac{a'}{b'})^2} \quad (8)$$

where
$$\beta^2 = M^2 - 1 \quad (9)$$

$$m = \frac{(b^2 - a^2) \sin\Psi \cos\Psi}{b'^2} \quad (10)$$
$$b' = \sqrt{a^2 \cos^2\Psi + b^2 \sin^2\Psi} \quad (11)$$

$$a'b' = ab \quad (12)$$

where
$C_L$ is the lift coefficient, i.e., $L/qs$, where $L$ is the lift and $s$ is the wings planform area;
R.P. is the "real part of" the radical solution;
$M$ is the Mach number;
$m$ is defined by (6);
$a$ and $b$ are the major and minor semi-axes of the elipse and
$\Psi$ is the complement of the angle of yaw as shown in FIG. 8.

Figure 9:
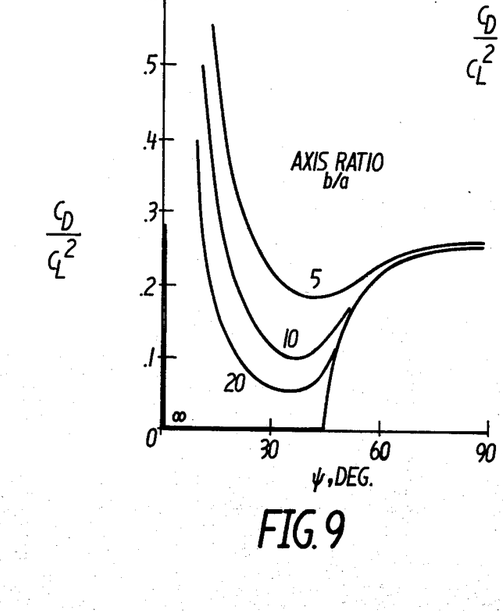
FIG. 9 is a diagram illustrating drag due to lift as a function of yaw angle for oblique elliptic wings at $M = 1.4$.

FIG. 9 shows the variation of the drag due to lift with angle of yaw for elipses of various proportions at a Mach number of 1.41.

Figure 10:
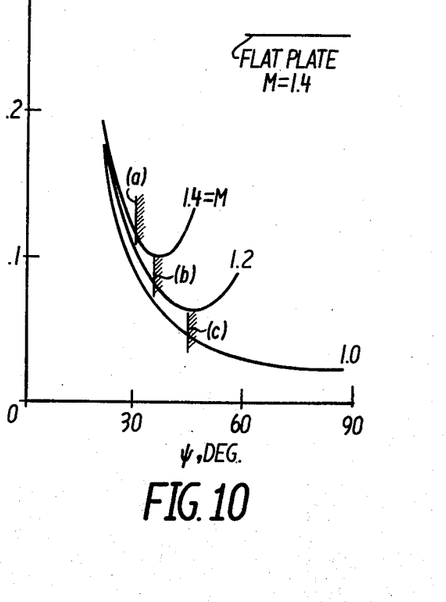
FIG. 10 is a diagram illustrating drag due to lift for oblique elliptic wings where $b/a = 10$.

FIG. 10 is similar to FIG. 9, but shows the effect of Mach number for an elliptic wing with an axis ratio of 10:1. At M = 1.0 the value shown is simply the induced drag or vortex drag which is, of course, large at large angles of yaw because of the small span. Also shown in FIG. 10 at (a), (b) and (c) respectively, are the angles of yaw at which the crosswise Mach number exceeds an assumed critical value of 0.7. The minimum wave drag for a given internal volume of the elliptic wing occurs when the thickness ratio of the section falls off elliptically toward the tip. See Jones, R. T., "Theoretical Determination of the Minimum Drag of Airfoils at Supersonic Speeds," *Journal of the Aeronautical Sciences*, Volume 19, No. 12, Dec. 1952.

Figure 11:
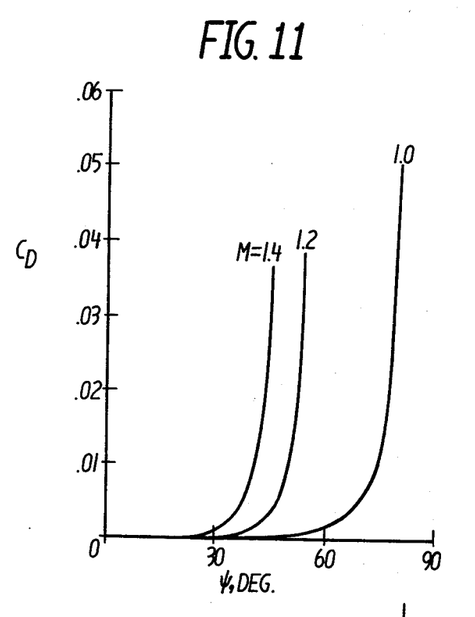
FIG. 11 is a diagram illustrating drag due to volume for oblique elliptic wings where $t/2a = 0.1$ and $b/a = 10$.

The formula for the drag due to the thickness or volume in the case of the yawed elipse is given in the above mentioned Smith reference; the results are plotted in FIG. 11 for an axis ratio of 10:1 and a root thickness/chord ratio of 0:1.

The wave drag associated with the volume of the wing shows a steep rise as the long axis of the wing turns into the direction of flight, the influence of the inverse fourth power of the projected length. Here, however, the drag increase associated with nonlinear or supercritical flow over the wing section may dominate so that the predication of linear theory will not be adequate.

Figure 12:
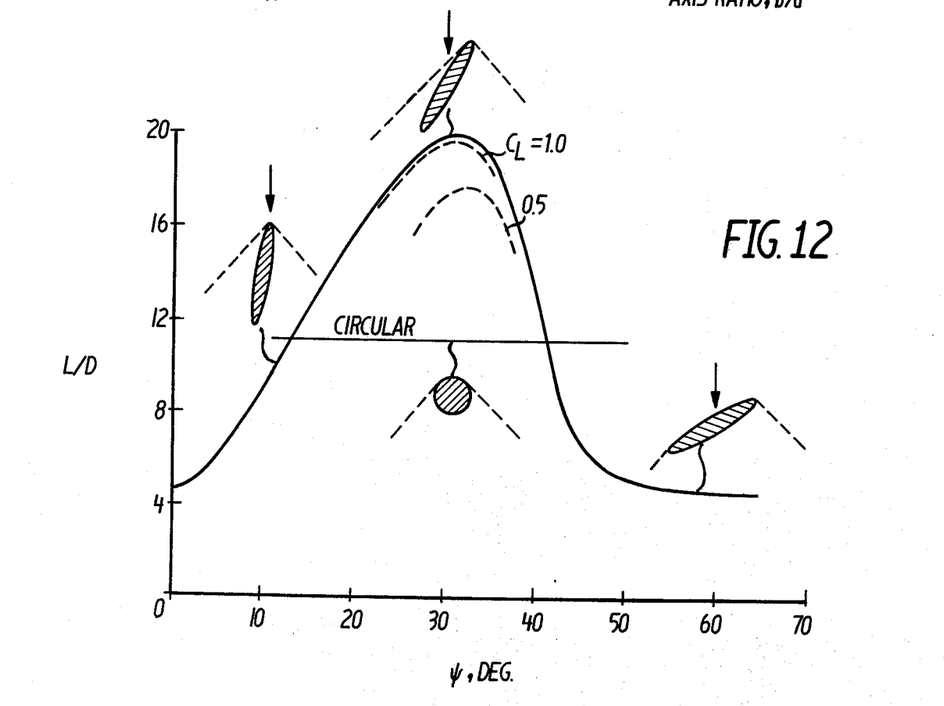
FIG. 12 is a diagram illustrating estimated lift/drag ratios for oblique elliptic wings at $M = 1.4$ where $b/a = 10(t/2a) = 1/10$.

The drag values given by linear theory together with a suitable estimate of the skin friction enable the prediction to be made of lift/drag ratios of elliptic wings at various Mach numbers and yaws angles. Such predictions will be valid if proper account is taken of the limitations imposed by nonlinear phenomena. FIG. 12 illustrates predictions for an elipse of 10:1 axis ratio, 10 percent thickness, and a friction drag coefficient of 0.005. The dotted curves show the effect of limiting the section lift coefficient to values of 1.0 and 0.5 respectively. Support for these curves may be found in Jones, R. T., "Aerodynamic Design for Supersonic Speeds," *Proceedings of the First International Congress in the Aeronautical Sciences*, Madrid, September 1958, and *Advances in Aeronautical Science*, Pergamon Press, 1959.

Figure 13:
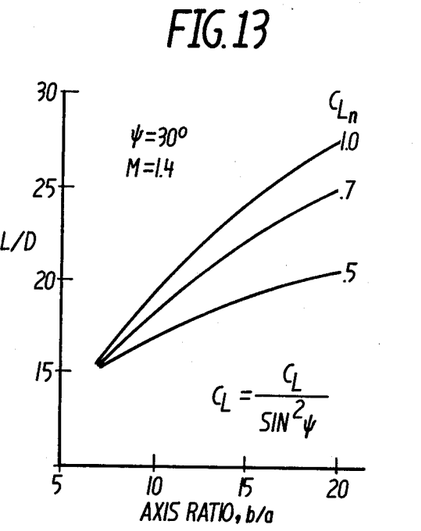
FIG. 13 is a diagram illustrating the variation of L/D with axis ratio and showing the effect of limitation of the normal lift coefficient $CL_n$.

FIG. 13 shows how the increase of L/D with aspect ratio depends on the possibility of achieving rather high lift coefficients.

Figure 14:
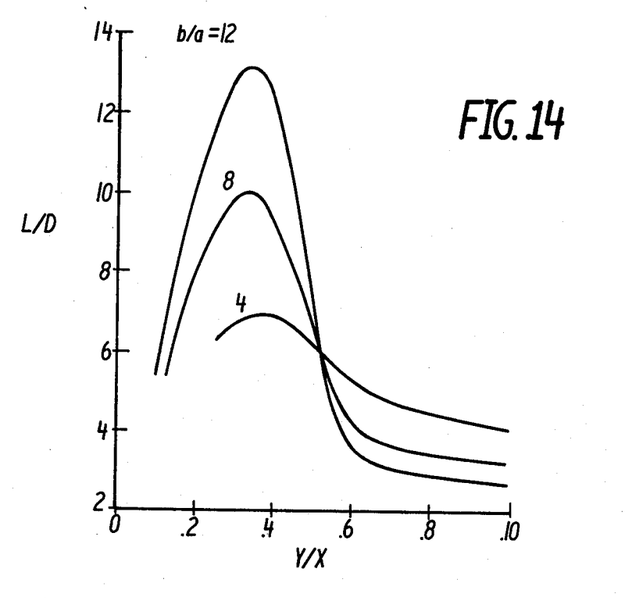
FIG. 14 is a diagram illustrating the estimated L/D ratio for $M = 2.0$.

Lift/drag values for yawed elliptic wings at M = 2.0 have been calculated in the above mentioned Smith reference. FIG. 14 shows results of this calculation. At M =2.0 peak lift drag ratios occur at $\Psi$= 15° to 20° corresponding to sweep angles of 70°–75°. The optimum crosswise Mach number indicated by linear theory is approximately 0.7, close to one limit imposed by non-linear effects.

Figure 15:
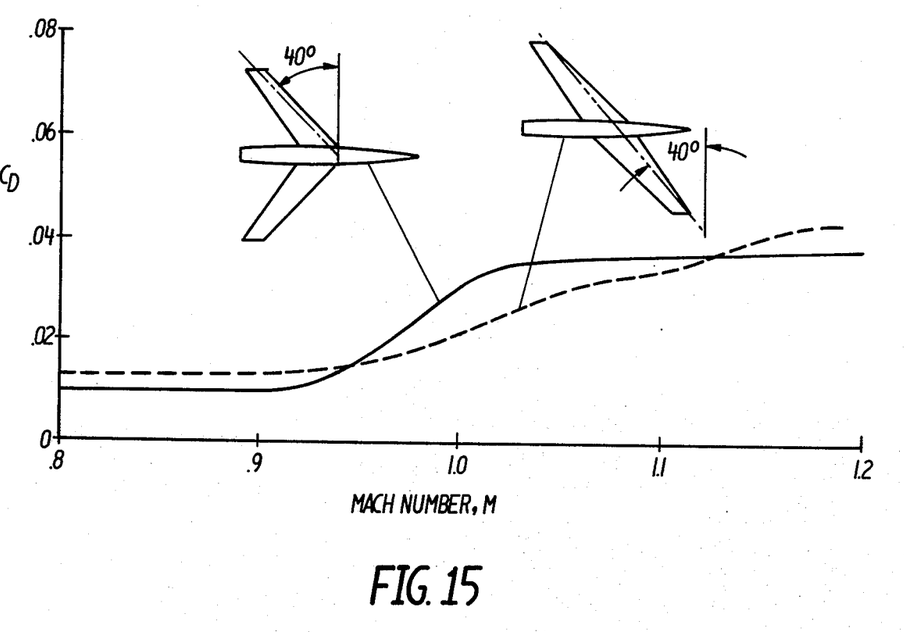
FIG. 15 is a diagram illustrating the drag at zero lift for yawed and swept wings.

In FIG. 15 the drag $C_D$ for yawed and swept wing bodies having sweep angles of 40° (yaw angle of 50°) are plotted as a function of Mach number, to show the drag at zero lift. As indicated, at M = 1.0 the anti-symmetric or yawed configuration has much smaller drag than does the symmetric configuration. However, at M = 1.15, the normal component of M is approximately 0.88, exceeding the drag rise Mach number of the sections. Beyond this point, the drag of the yawed wing is higher.

When the advantages of subsonic sweep first became evident, questions were raised about the possibility of flying an airplane with the wings set at a large angle of yaw. During the early experiments (see Campbell, J. P. and Drake, H. M., "Investigation of Stability and Control Characteristics of an Airplane Model with Skewed Wing in the Langley Free-Flight Tunnel," TN 1208, 1947, NACA), it was found that the yawed wing avoided the large rolling moment due to slideslip and the consequent short period rolling oscillations of the swept wing. It was also noted that the flight characteristics of the model remained essentially unchanged up to angles of yaw of 40° and were still satisfactory at 50°. Of special interest was the observation that deflection of the ailerons produced no observable pitching motion in free flight. Evidently, the change in longitudinal lift distribution produced by deflecting the ailerons is almost immediately cancelled by rolling motion. The wing, in effect, simply follows the helix angle defined by an effective twist associated with the aileron deflection with no significant changes in lift distribution. The longitudinal stability and the trimmed lift are then governed by the position of the aerodynamic center and the horizontal tail setting referred to the oblique axis of the wing.

While satisfactory stability can be achieved with the yawed wing in the normal flight range, some ususual effects will certainly be apparent. One effect that can be anticipated is a coupling between yaw angle and vertical acceleration, i.e., $\delta L/\delta \Psi$. A simple estimate for a wing at a 45° yaw can be shown by the expression $$(1/L)(\partial L/\partial \Psi) = 1 \qquad (9)$$

i.e., 1g per radian of slideslip angle $\Psi$. This value may be compared to the sensitivity of vertical acceleration to angle of attack ($\alpha$) changes. Assuming $\delta C_L \delta \alpha$ 5, and a flight lift coefficient of 1.0, the appropriate expression is $$(1/L)(\partial L/\partial \alpha) = 5 \qquad (10)$$

Hence, the sensitivity to yaw is about 1/5 the sensitivity to pitch.

Dynamic coupling between different degrees of freedom is not always undesirable since excessive damping in one mode may be distributed to a mode that would otherwise be deficient. Of course conventional treatments of stability, which assume bilateral symmetry with the resulting division into longitudinal and lateral motions, are inapplicable in this case, and a full treatment involving six degrees of freedom as well as aeroelastic deformations will be required.

Figure 16:
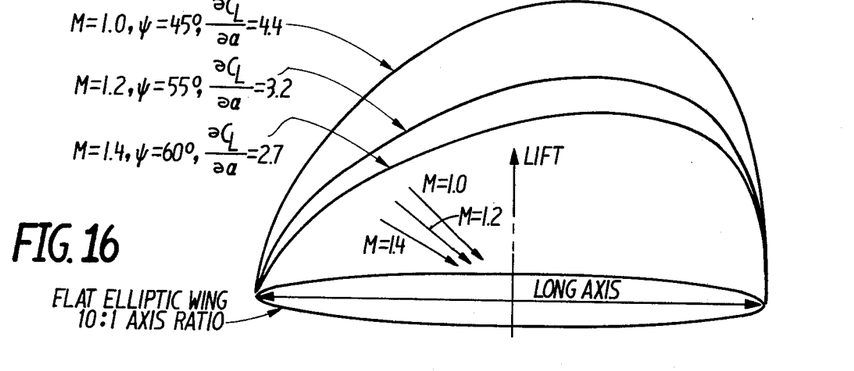
FIG. 16 is a diagram illustrating the lift distribution for a flat elliptic wing having a 10:1 axis ratio.

One of the problems encountered in utilizing a yawed wing having a flat chord plane is that at high angles of yaw, non-uniform lifting pressure will be developed along the long axis thereby imparting a roll moment to the aircraft. FIG. 16 shows the calculated span-wise distribution of lift for a flat elliptic wing at various yaw angles and Mach numbers. From these curves, it can be seen that the centroid of lift is shifted toward the trailing tip thereby producing a roll moment which would tend to cause the aircraft to roll to the right. Note also that since the lift is greater aft of the points at which the wing is affixed to the fuselage there will also be a tendency to produce a nose-down pitching moment.

Figure 17:
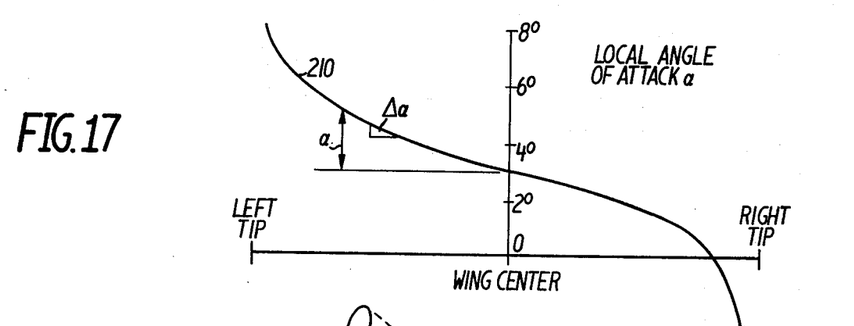
FIG. 17 shows a plan view of an upwardly curved elliptic wing, and an angular front view of the same wing showing the change in effective angle of attack developed in accordance with the present invention.

Curve 210 of FIG. 17 shows the variation in angle of attack that is needed along the span of elliptic wing 16 to equalize the lifting pressure when the wing is yawed at an angle of 45° and is flown at a speed of Mach 1. This curve indicates that the angle of attack of the forward tip must be increased and that of the trailing tip must be decreased.

Figure 18:
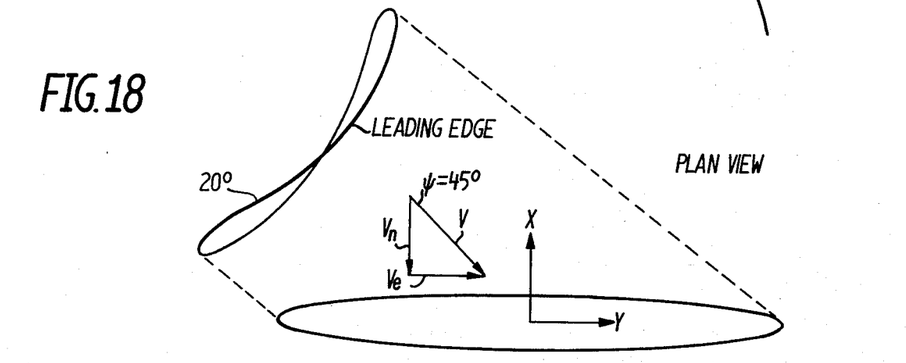
FIG. 18 is a front view of the wing shown in FIG. 16.
Figure 19:
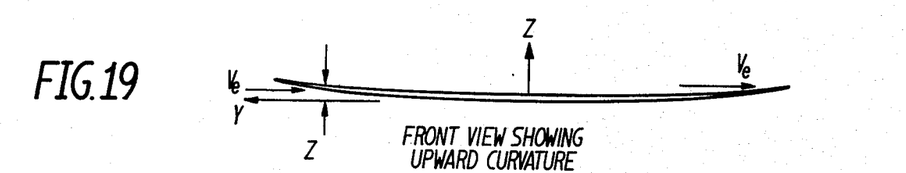
FIG. 19 is a diagram illustrating the local angle of attack of the wing shown in FIGS. 16 and 17 when in a Mach 1 configuration.

In order to vary the angle of attack along the length of wing 12 so as to eliminate the undesirable roll and pitch moments, the chord plane of wing 12, again shown in planform in FIG. 18 is bowed upwardly to form a curvilinear dihedral as discussed heretofore. This is shown in greater detail in the front view of FIG. 19. The effect of curving the ends of wing 12 upwardly is schematically illustrated in FIG. 18 by the projected angular front view shown at 200. Note that the forward portion of the wing presents its underside to the airstream at a greater angle while the trailing portion of the wing presents its underside to the airstream at a lesser angle than does a flat chord wing. Thus, the angle of attack of the leading tip is increased while the angle of attack of the trailing tip is decreased. This obviously modifies the lift characteristics of the yawed wing, since, as illustrated in FIG. 19, the end-wise component $V_e$ of the relative wing velocity vector V is directed against the underside of the leading tip and against the upper side of the trailing tip of wing 12.

The upward curvature of the wing may be represented mathematically by the function $$Z = f(y) \qquad (11)$$

where
  Z is the height of the chord surface above the XY plane, and
  y is measured in the direction of the long axis of the wing.

$\delta Z/\delta y$ then represents the upward slope of the chord surface at any point along the long axis. The curvature of the chord surface is assumed to be cylindrical with generators of the cylindrical shape (not necessarily a circular cylinder) lying parallel to the short axis of the wing.

The change of the local angle of attack $\alpha$, in terms of the yaw angle $\Psi$ and the slope $\delta Z/\delta y$, may be expressed as $$\Delta \alpha \cong \sin\psi \, \frac{\delta Z}{\delta y} \quad (12)$$

to a sufficient approximation.

As is well known, yawed or swept wings tend to stall first at the downstream tips. With the swept wing, the loss of lift at the tips leads to a nose-up tendency aggravating the stall. In addition to providing a trimmed lift distribution in normal flight, the upward curvature of the wing diminishes the stall tendency of the downstream tip. At best, it is, however, difficult to envision regular landings with the wing in the yawed position and it is therefore appropriate that means be provided for straightening the wing out for landing and take-off as indicated in the preferred embodiment.

Varying the angle of yaw has, of course, marked advantages for other flight conditions such as "holding" at subsonic speeds, or adapting the airplane to cruise efficiently at different Mach numbers since overland flights of the supersonic aircraft will probably be limited to Mach numbers low enough to avoid a supersonic boom. The aircraft may, however, fly much faster over water.

In operation, with aircraft 10 on the ground, wing 12 and horizontal stabilizer 13 are in the take-off (and landing) configuration illustrated in FIGS. 2, 3 and 4 of the drawings. In this configuration which is suitable for speeds of less than Mach 0.7, the aircraft is highly stable at low speeds (stall speed is approximately 100 mph) and wing 12 provides adequate lift at relatively low angles of attack (approximately 10° at take-off). Accordingly, the power required from engines 20 and 21 is substantially less than that required for a prior art supersonic aircraft of equivalent weight which, being designed for supersonic flight, has lifting surfaces providing relatively low lift at low speed and thus must utilize substantially greater power and higher angles of attack in order to achieve the necessary lift required at the low take-off and landing speeds. As aircraft 10 approaches supersonic flight, wing 12 and horizontal stabilizer 13 are simultaneously yawed relative to the direction of flight to parallel positions 17 and 9 (FIG. 2). Either the left or right wing tip may be moved forward. It was discussed herebefore that it is not essential to the invention that horizontal stabilizer 13 be yawed or have a curvilinear dihedral.

An analytical comparison of a yawable wing aircraft, designed to cruise at M = 2.0 on a transatlantic flight, to a delta wing type aircraft of the same gross weight, will show a significant saving in fuel and an increase in pay load of about 100 percent. Even assuming no gain in L/D at M = 2.0, the yawed wing is capable of carrying twice the pay load on a transatlantic flight because of its better off-design performance. It is estimated that current supersonic transports may consume as much as 40 percent of the fuel load in subsonic maneuvers. The ability to cruise or hold efficiently at reduced speed would thus be important for the utility of such aircraft. Current delta-wing transports require large amounts of power for take-off, primarily because of large values of weight per unit span. Since the take-off diminishes approximately as the 3/2 power of the span loading, an extension of the wing span in accordance with the present invention can be very effective in reducing take-off distance and noise.

Although the present invention has been described above with reference to a single preferred embodiment, it is contemplated that many additional embodiments, alterations and modifications will become apparent to those of ordinary skill in the art after having read the above disclosure. For example, horizontal stabilizer 13 may be passively pivoted at point 18 rather than being positively driven. Further, it is still possible to control the aircraft with the horizontal stabilizer rigidly attached to the vertical stabilizer. The penalty for doing so is a slight decrease in performance.

What is claimed is:
1. An aircraft having variable airframe geometry for accommodating efficient flight at subsonic, transonic, and supersonic speeds, comprising:
   a wing having an approximately elliptic planform, and a curvilinear dihedral formed by the lateral extremities of said wing being curved upwardly from the midspan so as to obtain a substantially elliptical lift coefficient distribution along its length;
   a single elongated fuselage pivotally connected to said wing;
   means for rotating said wing relative to said fuselage such that in the transonic and supersonic speed regimes said wing is oblique with respect to said fuselage and at take-off and landing said wing is perpendicular to said fuselage.

2. An aircraft having variable airframe geometry for accommodating efficient flight at subsonic, transonic, and supersonic speeds, comprising:
   a single elongated fuselage having a longitudinal axis;
   a wing pivotally connected to said fuselage, said wing having a long axis and the tips of said wing being curved upwardly from the midspan thereof to form a curvilinear dihedral, the change in local angle of attack ($\Delta\alpha$) along said wing being governed by the relationship $$\Delta\alpha \cong \frac{\delta Z}{\sin\Psi \, \delta y}$$

where $\Psi$ is a preselected yaw angle of said wing, $\delta Z/\delta y$ is the slope of the chord surface defined by the chord lines of said wing, $Z$ is the ordinate of the point and $y$ is the abscissa of the point referenced to a plane tangent to said chord surface at the center point of said wing, the cross-sectional distribution of said wing being governed by $$S'(y) = A_2 \sin 2\theta$$

where $S$ is the cross-sectional area at position $y$ from the midspan, $A_2$ is a constant and $\theta$ is defined by $$\cos\theta = \frac{2y}{b}$$

where $b$ is the span,
   said wing long axis and said fuselage longitudinal axis forming an angle;

means for varying said angle, said angle being 90° at take-off and landing, and less than 90° when said aircraft is in the transonic and supersonic modes.

3. An aircraft according to claim 2 further comprising a fixed horizontal stabilizer.

4. An aircraft having variable airframe geometry for accommodating efficient flight at subsonic, transonic, and supersonic speeds, comprising:
a single elongated fuselage having a longitudinal axis;
a wing having a long axis and an approximately elliptic planform;
means for pivotably connecting said wing at its midspan to said fuselage;
means for positioning said wing long axis obliquely to said fuselage longitudinal axis when said aircraft is in the transonic and supersonic regimes; and
means for producing an approximately symmetrical lift along said wing long axis when said wing is oblique to said fuselage longitudinal axis, said means causing the angle of attack of the leading wing tip to be greater than the angle of attack of the trailing wing tip.

5. An aircraft having a variable airframe geometry for accommodating efficient flight at subsonic, transonic, and supersonic speeds, comprising:
a wing having an approximately elliptic planform; a curvilinear dihedral formed by curving upwardly from midspan the lateral extremities of said wing; a change in the local angle of attack ($\Delta\alpha$), in terms of a selected yaw angle ($\Psi$) and the slope ($\delta Z/\delta y$) of the chord surface defined by the chord lines of the wing, at any point on said chord surface lying along the long axis of said wing, being defined by the expression $$\Delta\alpha \cong \frac{\delta Z}{\sin\Psi} \frac{}{\delta y}$$

where $Z$ is the ordinate of the point and $y$ is the abscissa of the point referenced to a plane tangent to said chord surface at the center point of said wing; a cross-sectional area distribution that decreases from midspan according to $$S'(y) = A_2 \sin 2\theta$$

where $S$ is the cross-sectional area at position $y$ from the midspan, $A_2$ is a constant and $\theta$ is defined by $$\cos\theta = \frac{2y}{b}$$

where $b$ is the span;
a single elongated fuselage pivotally connected to said wing;
means for rotating said wing relative to said fuselage such that in the transonic and supersonic speed regimes said wing is oblique with respect to said fuselage and at take-off and landing said wing is perpendicular to said fuselage.

6. In an aircraft having a fuselage and a pivotal wing, a method to optimize said aircraft's capabilities at subsonic, transonic, and supersonic speeds, comprising the following steps:
selecting said wing to have an elliptic planform with a curvilinear dihedral formed by curving the lateral extremities of said wing upwardly from midspan;
placing said wing perpendicular to the longitudinal axis of said fuselage at take-off and landing; and
rotating said wing at transonic and supersonic speeds to an angle of yaw relative to said longitudinal axis of said fuselage such that the Mach number of the free airstream normal to the longitudinal axis of said wing is less than the critical Mach number corresponding to the configuration of said wing.

7. In an aircraft having a fuselage and a single wing, a method to optimize said aircraft's performance in subsonic, transonic, and supersonic speed regimes, comprising the following steps:
selecting a wing of elliptic planform with a curvilinear dihedral formed by curving the lateral extremities of said wing upwardly from midspan;
changing the local angle of attack ($\Delta\alpha$) on said wing according to the expression $$\Delta\alpha \cong \frac{\delta Z}{\sin\Psi} \frac{}{\delta y}$$

where $\Psi$ is a preselected yaw angle of said wing, ($\delta Z/\delta y$) is the slope of the chord surface defined by the chord lines of said wing, $Z$ is the ordinate of a point of interest and $y$ is the abscissa of the point referenced to a plane tangent to said chord surface at the center point of said wing;
changing the cross-sectional area distribution of said wing decreasingly from midspan according to the expression $$S'(y) = A_2 \sin 2\theta$$

where $S$ is the cross-sectional area at position $y$ from the midspan, $A_2$ is a constant and $\theta$ is defined by $$\cos\theta = \frac{2y}{b}$$

where $b$ is the span;
affixing pivotally said wing at midspan to said fuselage such that at take-off and landing the longitudinal axis of said wing is perpendicular to the longitudinal axis of said fuselage;
rotating said wing about the center point in transonic and supersonic speed regimes to an angle of yaw relative to said fuselage axis such that the Mach number of the free stream normal to the longitudinal axis of said wing is less than the critical Mach number corresponding to the configuration of said wing.

8. An aircraft having variable airframe geometry for accommodating efficient flight at subsonic, transonic, and supersonic speeds, comprising:
a single fuselage;
a wing having a long axis, said wing being pivotally connected at its midspan to said fuselage, said wing being upwardly curved from said midspan connection towards its tips to form a curvilinear dihedral;
a horizontal stabilizer having a long axis, said stabilizer being pivotally connected to said fuselage and said long axis being spaced apart in substantial parallel relationship with said wing long axis; and means for positioning said wing and said stabilizer oblique to said fuselage when said aircraft is flying at transonic and supersonic speeds.

9. An aircraft as recited in claim 8 wherein the angle of wing yaw relative to said fuselage is such that the Mach number of the free stream normal to said wing long axis is less than the critical Mach number.

10. An aircraft as recited in claim 9 wherein said positioning means includes means for positioning said wing long axis perpendicular to said fuselage at times of take-off and landing.

11. An aircraft as recited in claim 10 wherein said wing has a cross-sectional area distribution $S'(y)$ that decreases from midspan to tip according to $$S'(y) = A_2 \sin 2\theta$$

where $S$ is the cross-sectional area at position $y$ from the midspan, where $b$ is the span, $A_2$ is a constant and $\theta$ is defined by $$\cos \theta = \frac{2y}{b}.$$

12. An aircraft as recited in claim 11 and further comprising a pair of propulsion units wherein each of said propulsion units has a longitudinal axis, said propulsion unit longitudinal axes are substantially parallel to the longitudinal axis of said fuselage, said propulsion units are equidistantly spaced from said fuselage longitudinal axis, one of said propulsion units is forward of the other, and said propulsion units are disposed on an oblique line whose sweep angle is greater than the Mach angle corresponding to the highest operating speed of said aircraft.

13. An aircraft as recited in claim 12 wherein the change in the local angle of attack ($\Delta\alpha$) of said wing, in terms of a selected yaw angle ($\Psi$) and the slop ($\delta Z/\delta y$) of the chord surface, defined by the chord lines of the wing, at any point on said chord surface lying along the long axis of said wing, is defined by the expression $$\Delta\alpha \cong \frac{\delta Z}{\sin\Psi \; \delta y},$$

where $Z$ is the ordinate of the point and $y$ is the abscissa of the point referenced to a plane tangent to said chord surface at the center point of said wing.

14. An aircraft having variable airframe geometry for accommodating efficient flight at subsonic, transonic, and supersonic speeds, comprising:

a single elongated fuselage having a longitudinal axis;

a wing having an approximately elliptic planform and a smooth and continuous distribution of volume from midspan to tips, said wing being pivotally connected to said fuselage, the tips of said wing being curved upwardly from the center thereof to form a curvilinear dihedral so as to obtain a substantially elliptical lift coefficient distribution along its length whe said wing is oblique to said fuselage; and a pair of propulsion units, each of said propulsion units having a longitudinal axis, said propulsion unit longitudinal axes being substantially parallel to said fuselage longitudinal axis, said propulsion units being equidistantly spaced from said fuselage longitudinal axis, one of said propulsion units being forward of the other, and the stagger angle of said two units being greater than the Mach angle corresponding to the highest operating speed of said aircraft.

15. An aircraft having variable airframe geometry for accommodating efficient flight at subsonic, transonic, and supersonic speeds, comprising:

a wing having an approximately elliptic planform and operative to develop aerodynamic lift for supporting said aircraft in flight, the lateral extremities of said wing being curved upwardly to form a curvilinear dihedral;

a single elongated fuselage pivotally connected to said wing;

means for rotating said wing relative to said fuselage;

the change in the local angle of attack ($\Delta\alpha$) of said wing, in terms of a selected yaw angle ($\Psi$) and the slope $\delta Z/\delta y$) of the chord surface defined by the chord lines of the wing, at any point on said chord surface lying along the long axis of said wing, being defined by the expression $$\Delta\alpha \cong \frac{\delta Z}{\sin\Psi \; \delta y},$$

where $Z$ is the ordinate of the point and $y$ is the abscissa of the point referenced to a plane tangent to said chord surface at the center point of said wing;

a pair of propulsion units each having a longitudinal axis, said propulsion unit longitudinal axes being substantially parallel to the longitudinal axis of said fuselage, said propulsion units being on opposite sides of said fuselage, one of said propulsion units being forwardly disposed of said other unit, said propulsion units being disposed on an oblique line whose sweep angle is greater than the Mach angle corresponding to the highest operating speed of said aircraft.

16. An aircraft having variable airframe geometry for accommodating efficient flight at subsonic, transonic, and supersonic speeds, comprising:

a single elongated fuselage having a longitudinal axis;

a wing pivotally connected to said fuselage, the tips of said wing being curved upwardly from the midspan thereof to form a curvilinear dihedral so as to obtain a substantially elliptical lift coefficient distribution along its length when said wing is oblique to said fuselage;

means for positioning said wing oblique to said fuselage longitudinal axis when said aircraft is in the transonic and supersonic regimes;

the change in the local angle of attack ($\Delta\alpha$) of said wing, in terms of a selected yaw angle ($\Psi$) and the slope ($\delta Z/\delta y$) of the chord surface, defined by the chord lines of the wing, at any point on said chord surface lying along the long axis of said wing, being defined by $$\Delta\alpha \cong \frac{\delta Z}{\sin\Psi \; \delta y}$$

where $Z$ is the ordinate of the point and $y$ is the abscissa of the point referenced to a plane tangent to said chord surface at the center point of said wing;

a pair of propulsion units, each of said propulsion units having a longitudinal axis, said propulsion unit longitudianl axes being substantially parallel to said fuselage longitudinal axis, said propulsion units being equidistantly spaced from said fuselage longitudinal axis, on of said propulsion units being forward of the other, and said propulsion units being disposed on an oblique line whose sweep angle is greater than the Mach angle corresponding to the highest operating speed of said aircraft.

17. An aircraft as set forth in claim 16 wherein said wing has a cross-sectional area distribution $S'(y)$ that decreases from midspan to each tip according to $$S'(y) = A_2 \sin 2\theta$$

where $S$ is the cross-sectional area at position $y$ from the midspan where $b$ is the span, $A_2$ is a constant, and $\theta$ is defined by $$\cos \theta = \frac{2h}{b}.$$

18. An aircraft having variable airframe geometry for accommodating efficient flight at both subsonic and supersonic speeds, comprising:
a wing having approximately elliptic planform and operative to develop aerodynamic lift for supporting said aircraft in flight, the lateral extremities of said wing being curved upwardly to form a curvilinear dihedral;
a single elongated fuselage pivotally connected to said wing;
means for rotating said wing relative to said fuselage;
the change in the local angle of attack ($\Delta\alpha$) of said wing, in terms of a selected yaw angle ($\Psi$) and the slope ($\delta Z/\delta y$) of the chord surface, defined by the chord lines of the wing, at any point on said chord surface lying along the long axis of said wing, being defined by $$\Delta\alpha \cong \frac{\delta Z}{\sin\Psi \ \delta y}$$

where $Z$ is the ordinate of the point and $y$ is the abscissa of the point referenced to a plane tangent to said chord surface at the center point of said wing;
a pair of propulsion units each having a longitudinal axis, said propulsion unit longitudinal axes being substantially parallel to the longitudinal axis of said fuselage, one of said propulsion units being forwardly disposed of said other unit, said propulsion units being disposed on an oblique line whose sweep angle is greater than the Mach angle corresponding to the highest operating speed of said aircraft;
a horizontal stabilizer with a long axis, said stabilizer being pivotally connected to said fuselage, said long axis of said stabilizer being substantially in parallel with said long axis of said wing, and means for rotatiang said stabilizer with respect to said fuselage.

19. In an aircraft having a single elongated fuselage with a longitudinal axis, a wing having a long axis, means for pivotably connecting said wing to said fuselage, means for positioning said wing long axis perpendicular to said fuselage longitudinal axis at take-off and landing and obliquely to said fuselage longitudinal axis at cruising speeds, means for producing an approximately symmetrical lift along said wing long axis when said wing is oblique to said fuselage longitudinal axis, said means causing the angle of attack of the leading wing tip to be greater than the angle of attack of the trailing wing tip.

20. In an aircraft having a single elongated fuselage with a longitudinal axis, a wing having a long axis, means for pivotably connecting said wing to said fuselage, means for positioning said wing long axis perpendicular to said fuselage longitudinal axis at take-off and landing and obliquely to said fuselage longitudinal axis at cruising speeds, said wings including a curvilinear dihedral so that the lift along the wing long axis will be approximately symmetrical when said wing long axis is oblique to said fuselage longitudinal axis.

* * * * *